Patented Oct. 6, 1925.

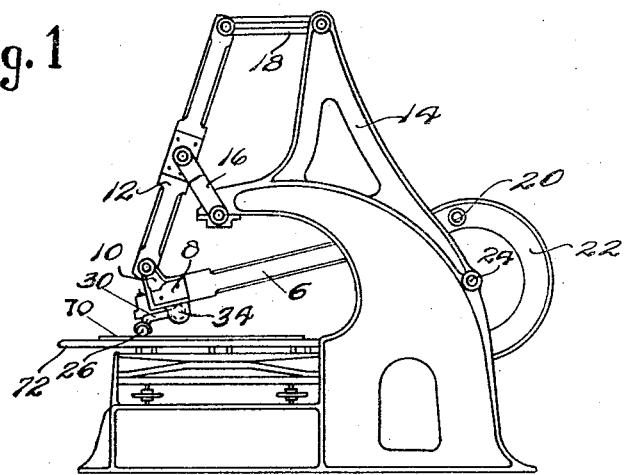

1,556,071

UNITED STATES PATENT OFFICE.

AUGUST C. BRILL, OF OBERURSEL, NEAR FRANKFORT-ON-THE-MAIN, GERMANY, ASSIGNOR TO THE TURNER TANNING MACHINERY COMPANY, OF PORTLAND, MAINE, A CORPORATION OF MAINE.

GLAZING MACHINE FOR OPERATING ON LEATHER, HIDES, AND THE LIKE.

Application filed March 9, 1925. Serial No. 14,267.

*To all whom it may concern:*

Be it known that I, AUGUST C. BRILL, a citizen of the German Republic, residing at Nr. 1 Uhland-Strasse, of Oberursel, near Frankfort-on-the-Main, Germany, have invented certain new and useful Improvements in and Relating to Glazing Machines for Operating on Leather, Hides, and the like, of which the following is a specification.

This invention relates to machines for treating sheet material. The invention is herein illustratively disclosed as embodied in a machine of the type disclosed in United States Letters Patent No. 681,856, granted Sept. 3, 1901, on application of Albert F. Jones, and designed for glazing hides, skins and leather.

In machines of the type referred to, a glazing tool, spring-pressed on the work for the purpose of securing uniform pressure, moves over the surface of the work in a predetermined path, the work being shifted between successive operations of the tool in order that all parts of the work may be operated on.

It is an object of this invention to provide an improved machine of the type referred to, which will be better adapted to accommodate itself to work of different characteristics, such as differences in thickness. It is to be understood, however, that in various aspects the invention is not limited to embodiment in a machine of the illustrated type.

To this end and in accordance with features of the invention there is provided in the illustrated machine improved means for mounting the work treating tool so that it may be self-accommodating to operate properly upon different pieces of work or different portions of the same piece of work characterized by changes in the thickness dimension thereof and particularly where the variations in thickness extend in a direction transverse of the path of the work treating movement of the tool. Preferably, and as shown, the tool is adapted to move in directions toward and from the work and also to tip about an axis extending transversely of the longitudinal axis of the tool, the arrangement being such that tipping of the tool takes place in a plane extending transversely of the described path of movement of the tool. Conveniently the tool carrier is mounted in its support by means, comprising a universal joint, which provides for the described movements of the tool while the latter is maintained under the pressure of spring means designed as above stated, to secure substantially uniform application of the tool to the work.

Other features of the invention and novel combinations of parts will be described in the detailed specification and pointed out in the appended claims.

In the drawings,

Fig. 1 is a view in side elevation of a glazing machine showing one embodiment of the invention;

Fig. 2 is a view in side elevation and partly in section of the glazing tool supports therefor;

Fig. 3 is a view in front elevation of the parts shown in Fig. 2; and

Fig. 4 is a front elevation corresponding to that of Fig. 3 but showing the glazing roll in an inclined position due to its being in contact with a piece of work of unequal thickness.

The illustrated glazing machine which is designed for hides, skins or leather is provided with an operating member or a crank rod 6 which carries at its forward end a metal shoe 8 for supporting the work operating parts of the machine. Conveniently and as shown, the shoe 8 has an extension 10 to the upper end of which is pivoted the lower end of a pendulum 12 which is pivotally supported with respect to the frame 14 of the machine by means of links 16 and 18 in an old and well known manner as disclosed, for instance, in Patent No. 681,856, already referred to. At its other end the crank rod or operating member 6 is pivotally connected at 20 to a wheel 22 fixedly carried by shaft 24, the latter being driven by power means not shown.

The work operating parts referred to in the foregoing paragraph comprise in the illustrated machine a glazing roll 26 securely attached by a clamping means 28 to a tool carrier or holding block 30. Preferably, and as shown, the block or carrier 30 is provided with a ball 32 which is part of a ball and socket joint, the socket part being disclosed at 34 as formed in an extension of the metal shoe 8. It will be understood that another form of universal joint than the ball and socket form might be used. In the illustrative construction the shoe 8 has a forwardly extending portion adapted to provide a casing 36 for a spring 38 designed to press upon the forward end of the tool holding block 30 which normally has its forward end projecting into the lower portion of the casing 36 and held therein against the pressure of the spring 38 by holding means such as the rods 40 and 42 (Figs. 3 and 4). Preferably, and as shown, the rods 40 and 42 pass at their lower ends loosely through openings in lugs or ears 44 and 46 respectively, extending laterally from the front end of the block 30, the openings being large enough so that the rods 40 and 42 will not bind therein upon tipping movement of the tool holding block 30 about its longitudinal axis. At their upper ends the rods or bolts 40, 42 pass each through an ear 48 or 50 extending laterally from the upper end of the casing 36. The upper ends of the rods or bolts 40, 42 are screw threaded to receive nuts 52 which serve to retain the bolts or rods 40, 42 against downward displacement so that the latter operate to prevent the tool holding block 30 from occupying a position in contact with the work during the idle stroke of the tool or glazing roll 26. In other words, through the operation of the nuts 52 the position of the tool 26 with respect to the work on the bed, may be adjusted, the arrangement being such, however, that the tool may move upwardly and also in other directions as will be hereinafter described in adjusting itself to variations in the work. Preferably, and as shown, the forward end of the tool holding block 30 is provided with a concave seat for a spring seating plate 60, a metal cap plate 62 being provided in the upper end of the casing 36 for contact with the upper end of the spring 38, the purpose of the metal cap 62 being to permit adjustment of the tension of the spring 38 through proper manipulation of an adjusting screw 64 threaded through the upper end of the casing 36. In the construction shown, the forward end of the tool holding block 30 is provided with a guide pin 66 movable in a slot 68 in the lower end of the front wall of the casing 36, the purpose of the guide pin 66 being to prevent lateral movement of the front end of the block 30 while, at the same time, permitting vertical movement of the block and also turning movement thereof about its longitudinal axis.

In operating with a glazing machine, like that illustrated in the drawings, a piece of leather will be introduced between the glazing tool 26 and a bed 70 which rests upon a support 72, there being provided a relatively broad table (not shown) of considerable area and commonly used to support the piece of leather or other material undergoing operations. It will be readily understood that only that part of the work which rests upon the bed 70 will be operated upon by the glazing roll 26 during reciprocation of the latter and that the work must be constantly shifted by the operative in order that all parts of the work may receive like attention, the work being shifted during the inoperative or idle stroke of the glazing tool. In Fig. 3 the tool 26 is illustrated during a forward, inoperative part of the stroke. In Fig. 4, the tool 26 is shown operating upon a piece of work 74 of such a character that portions thereof vary greatly in thickness in localized areas, the result being that the tool 26 adjusts itself automatically to the variation in the thickness of the work even where these variations in thickness extend in a direction transverse of the path of the tool. Heretofore, so far as applicant is aware, no glazing machine has ever been constructed which would permit such self adjustment of the tool to the requirements of the work.

Having thus described my invention, what I claim as new and desire to secure by Letters Patent of the United States is:—

1. In a machine for treating hides, skins and leather, an operating member, a work-treating tool, means for connecting the tool with the member constructed to provide for up and down movements of the tool and also for tipping movements of the tool in planes extending transversely of the path of the work-treating movement of the tool, and means for preventing movement of translation of the tool in a direction transverse of its path on the work.

2. In a machine for treating hides, skins, and leather, an operating member, a tool holding member, a universal joint connection between the tool holding member and the operating member, spring means acting to press the tool holding member toward the work, and a work treating tool carried by the last-mentioned member.

3. In a machine for treating hides, skins, and leather, a work support, an operating member, a shoe at the front end of the operating member, a tool holding block, a universal joint connection between the block and the shoe, a spring contained by the shoe and arranged to press the tool holding block toward the work support, and a tool carried by the block and operative under pressure of the spring to adjust itself to work-thickness variations which take place in directions transverse of the path of the tool on the work.

4. In a machine for treating hides, skins and leather, an operating member, a tool holding block, a universal joint connection between the block and the front end of said member, a tool carried by the block, spring means between the block and the operating member and operative to exert pressure upon the tool, and connecting means for holding the tool against the pressure of the spring means constructed to permit tipping of the tool about the longitudinal axis of the tool holding block.

5. In a machine for treating hides, skins and leather, an operating member, a tool for operating on the work, and connecting means between the tool and the operating member for permitting movement of the tool toward and from the work and also a tipping movement of the tool about an axis extending transversely of the longitudinal axis of the tool, said means comprising a guide member for preventing movement of translation of the tool in a direction transverse of its path on the work.

6. In a machine for glazing pieces of leather, a bed for supporting sheet material, a glazing tool movable for operating on the material, a tool holding block, a movable support for the block, and a universal joint connection between the block and the block support arranged to provide for movement of the block and of the tool toward and from the bed and also for a tipping movement of the block and tool about a longitudinal axis of the block, whereby the glazing tool is self-adjusting to variations in the thickness dimension of the material on the bed in directions both parallel and transverse of the path of operative movement of the glazing tool over the material.

7. In a machine for treating hides, skins, and leather, a work-treating tool having a larger dimension thereof extending in a direction transverse of the path of the tool on the work, a member for operating the tool, means associated with the operating member to prevent movement of the tool in a direction transverse of its path, and connections between the tool and the member designed to provide for tipping movement of the tool in a number of planes extending through the work transversely of the path of the work-treating movement of the tool.

8. In a machine for glazing pieces of leather, a glazing tool, a holding block for the tool, a member for operating the block and tool over the work, a universal joint connection between the holding block and the member, spring means operating continuously in a direction to force the tool into contact with the work, and means comprising a guide pin for preventing lateral movement of the tool while permitting tipping movement of the tool about the longitudinal axis of the holding block and also up and down movement of the tool with reference to the operating member.

9. In a machine for treating hides, skins and leather, a reciprocable member, a tool holding member, a ball and socket connection between one end of the tool holding member and the reciprocable member, spring means for operating upon the other end of the tool holding member, and a tool carried by the last mentioned member at one end thereof for operating on the work while under pressure of the spring means.

10. In a machine for glazing pieces of leather, a work supporting bed and a glazing tool relatively movable to cause the tool to operate on the work to glaze successive portions of the work, a tool holding member, a universal joint connection between the tool and the member, and a spring for pressing the tool toward the work on the bed, the arrangement being such that the tool adjusts itself to variations in the thickness of the work which take place in a direction transverse of the path of the tool on the work.

11. In a machine for treating hides, skins and leather, an operating member, a work-treating tool, and connections between the tool and the operating member comprising a tool-carrying member rigidly connected to the tool and having movement about two intersecting axes to permit movement of the tool toward and from the work and also in planes extending transversely of the work-treating movement of the tool, and spring means acting to press the tool toward the work.

12. In a machine for treating hides, skins, and leather, a bed for supporting sheet material, a work-treating tool, an operating member, connections between the tool and operating member, comprising a tool-carrying member rigidly connected to the tool and having movement about two intersecting axes, said operating member being constructed and arranged to cause movement of the tool over the surface of the work to treat different parts of the work and the tool-carrying member being constructed and arranged to pivot about said axes to permit adjusting movement of the tool toward and from the work and in planes extending transversely of the path of work-treating movement of the tool, and spring means acting directly on the tool-carrying member to press the tool toward the work, whereby the tool is self-accommodating to variations in thickness of the work in directions both parallel and transverse of the work-treating movement of the tool.

In testimony whereof I have affixed my signature.

AUGUST C. BRILL.